United States Patent
Martinsen et al.

[19]

[11] Patent Number: 6,071,474
[45] Date of Patent: Jun. 6, 2000

[54] METHOD, APPARATUS AND PROCESSING PLANT FOR STERILIZING AND/OR HEAT TREATING PARTICULATE PRODUCTS

[75] Inventors: Per Martinsen, Klippinge; Verner Christiansen, Roskilde, both of Denmark

[73] Assignee: Atlas-Stord Denmark A/S, Ballerup, Denmark

[21] Appl. No.: 09/180,900

[22] PCT Filed: Aug. 19, 1997

[86] PCT No.: PCT/DK97/00332

§ 371 Date: Nov. 16, 1998

§ 102(e) Date: Nov. 16, 1998

[87] PCT Pub. No.: WO98/07334

PCT Pub. Date: Feb. 26, 1998

[30] Foreign Application Priority Data

Aug. 23, 1996 [DK] Denmark .................................. 0889/96

[51] Int. Cl.[7] .................................. A61L 2/08; A61L 9/00
[52] U.S. Cl. .......................... 422/26; 422/295; 422/309; 426/519; 426/521; 99/467; 99/483
[58] Field of Search ..................................... 426/521, 519; 422/26, 295, 224, 309; 99/467, 483

[56] References Cited

U.S. PATENT DOCUMENTS

| | | | |
|---|---|---|---|
| 1,735,392 | 11/1929 | Hiller | 426/519 |
| 4,967,651 | 11/1990 | Hsieh et al. | 99/470 |
| 4,994,294 | 2/1991 | Gould | 426/519 |
| 5,326,538 | 7/1994 | Walker | 422/184 |
| 5,389,347 | 2/1995 | Hall | 422/307 |

*Primary Examiner*—Nina Bhat
*Attorney, Agent, or Firm*—Antonelli, Terry, Stout & Kraus, LLP

[57] ABSTRACT

The invention is a method and an apparatus for the sterilization and/or heat treatment of product with the product being introduced in batches into a pressure vessel which lies substantially horizontal. A method in accordance with the invention includes providing a pressure vessel having a jacket and a helical vane arrangement along inner surface of the pressure vessel; placing a batch of the product in the pressure vessel; closing the pressure vessel and evacuating air therefrom, heating and pressurizing the vessel by supplying steam to the jacket of the pressure vessel to sterilize the product, the heating and pressure treatment occurring for a given period of time as a function of the product being treated therein; rotating the pressure vessel which causes a mixing/movement of the product to form particles of the product by contacting the product with the helical vane arrangement to produce movement of the product in opposite directions from one end of the pressure vessel to the other in response to rotation of the pressure vessel in a single direction; relieving pressure from the pressure vessel; and emptying heat treated particulate product from the pressure vessel.

24 Claims, 6 Drawing Sheets

FIG. 3

METHOD, APPARATUS AND PROCESSING PLANT FOR STERILIZING AND/OR HEAT TREATING PARTICULATE PRODUCTS

This application is a 371 of PCT/DK97/00332 filed Aug. 19, 1997.

BACKGROUND OF THE INVENTION

1. Field of the Invention

The invention concerns a method, an apparatus and a processing plant for the sterilization and/or heat treatment of products in particle form, e.g. bone meal, fish meal and other feedstuffs, in a horizontally-lying, rotatable pressure vessel.

2. Description of the Prior Art

It is known to sterilize bone meal and similar products in batches by heating the meal during stirring in a pressure vessel. The known pressure vessels for this purpose can be horizontally-lying vessels with a through-going horizonal axle which comprises mechanical stirring elements in the form of vanes which are secured to the vessel's through-going axle. Such a sterilization plant is characterized by high power consumption and risk of great wear and corrosion, in that the moving parts, i.e. the axle with the vanes, are constantly in contact with the product which is to be stirred/mixed. The risk of these parts suffering defects is thus very high, and the stirring is not as efficient as desirable.

The known types of apparatus with through-going, rotatable axle often have problems with the bearings and associated stuffing-boxes, namely where the axle passes the vessel walls. Here it is possible for the product to gain ingress to the stuffing-box and cause wear, one of the results being that the stuffing-boxes become leaky. There also hereby arises the possibility of the product being contaminated, possibly by non-sterile product remains, so that a batch which can be expected to be sterile nevertheless proves to be contaminated.

The present invention provides a method and apparatus which is not encumbered with the disadvantages of the known technique, and whereby a continuous mixing and uniform sterilization of the product is achieved with an optimum utilization of the vessel's capacity, while at the same time the risk of any defects arising is very small.

This is achieved by a method, and also where the pressure vessel is arranged to rotate and is provided with a built-in, inner helical-vane arrangement along the inner wall/jacket of the pressure vessel, said pressure vessel being closed and evacuated of air and heated, said heating being effected by a supply of steam to the jacket of the pressure vessel, and optionally by a supply of steam under pressure to the inside of the vessel, said heating and pressure treatment taking place for a given period of time, in that the process parameters are a function of the product to be treated, and said pressure vessel being made to rotate, said rotation giving rise to a mixing/movement of the particle-formed product, and a movement of the product from the one end of the pressure vessel to the other as a result of the inner helical-vane arrangement, said process vessel then being relieved of pressure, after which the process vessel is emptied of heat-treated/sterilized product and the batch process starts from the beginning.

By carrying out a mixing as disclosed, a continuous and constant mixing of the product takes place, so that the product is in constant movement and is heated uniformly, partly by the surfaces of the pressure vessel which, of course, are heated via the steam supply, and also by the supply of steam which optionally takes place inside the pressure vessel. There is hereby achieved a uniform processing of the product.

The apparatus according to the invention can be configured wholly or partly of stainless steel, so that corrosion by the meal, which in certain cases can be aggressive, is avoided.

By using a method according to the invention, there is achieved a continuous and efficient sterilization in relation to the chosen process parameters.

By using a method according to the invention, an optimum mixing and an optimum and uniform sterilization of the product is achieved.

By using a method according to the invention, an optimum utilization of the thermal characteristics of the steam is achieved.

By using a method according to the invention, a desired automation of the process is achieved.

By using a method according to the invention, it is achieved that the sterilized product is not contaminated during its removal.

The invention also concerns an apparatus for the sterilization and/or heat treatment of products in particle form, e.g. feedstuffs such as bone meal and fish meal, comprising a substantially horizontal and rotatable pressure-tight vessel. The apparatus also comprises a mixing arrangement provided in the vessel, said arrangement comprising a helical vane lying along the vessel's inner wall, called the outer vane, and a second helical vane called the inner vane fastened to said outer vane and at a distance from the inner wall, which vanes extend from the one end of the vessel towards the other.

There is hereby achieved a continuous mixing and uniform sterilization of the product with an optimum utilization of the vessel's capacity, while at the same time the risk that defects may arise is very small.

By using an apparatus according to the invention the product is conveyed forwards and backwards over the heating surfaces, i.e. the jacket, and at the same time does not clump together with the risk of a subsequent heterogeneous mixing of the product.

By using an apparatus according to the invention the sterilized product is not contaminated during removal.

By configuring an apparatus according to the invention, an expedient construction of the apparatus is achieved, so that the possibility is provided of being able to use and control all functions during operation, i.e. without having to stop the rotation of the vessel.

By using an apparatus according to the invention, it is achieved that the risk of leakage is minimized.

The invention also concerns a processing plant for the production of sterile bone meal while using the method and the apparatus as disclosed, and where the processing apparatus forms the boundary between the non-sterile and the sterile areas of the plant. It is hereby achieved that a contamination of the sterilized product does not occur during the full handling of the product from the moment that it is brought into the hall for processing until it again leaves the hall after the processing has taken place.

BRIEF DESCRIPTION OF THE DRAWINGS

The invention will now be described in more detail with reference to the drawing, where FIG. 3 shows the pressure vessel seen from the side and with partial cross-section included.

BRIEF DESCRIPTION OF THE PREFERRED EMBODIMENTS

Figure 1:
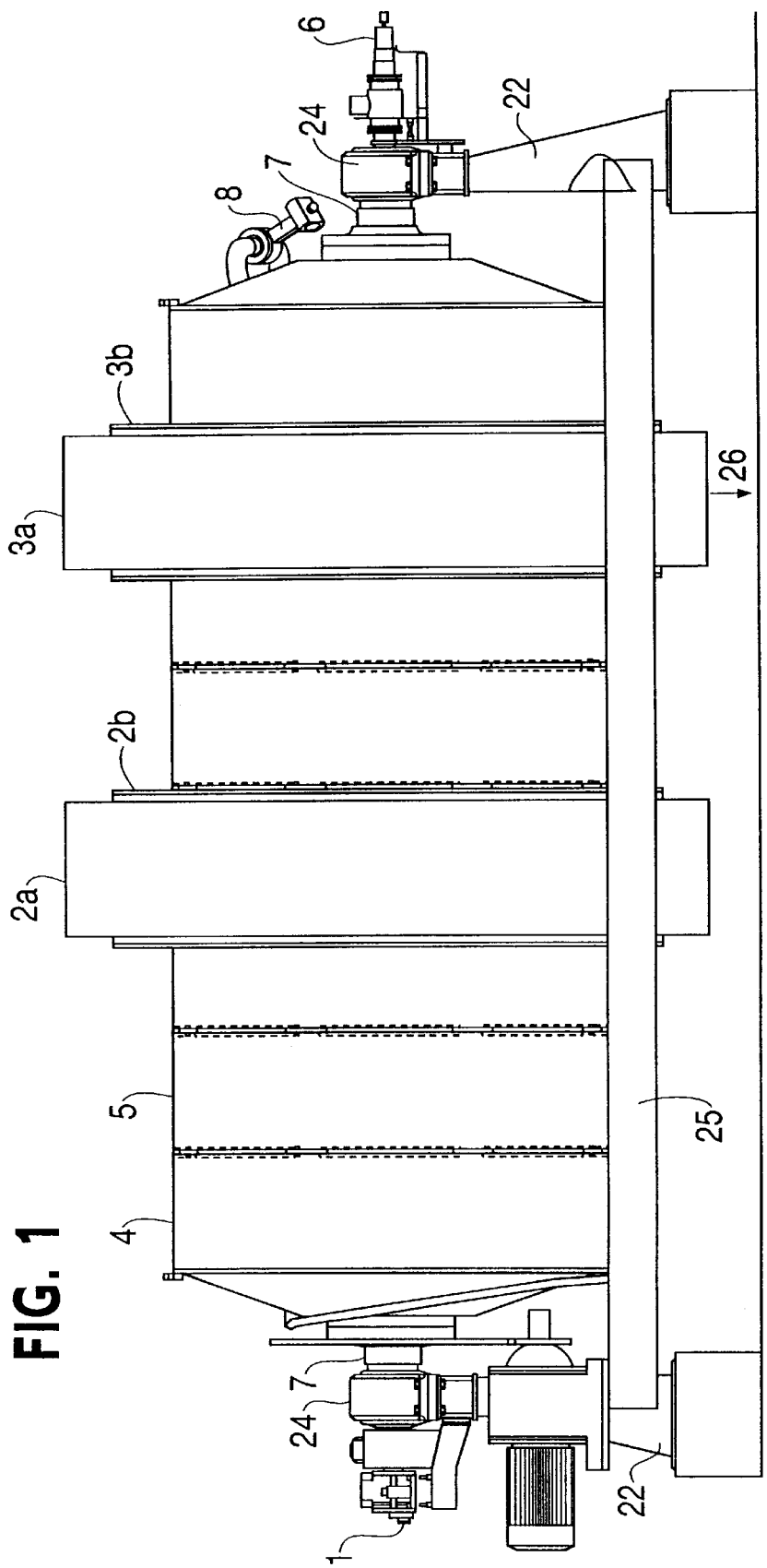
FIG. 1 shows the pressure vessel from the side.
Figure 2:
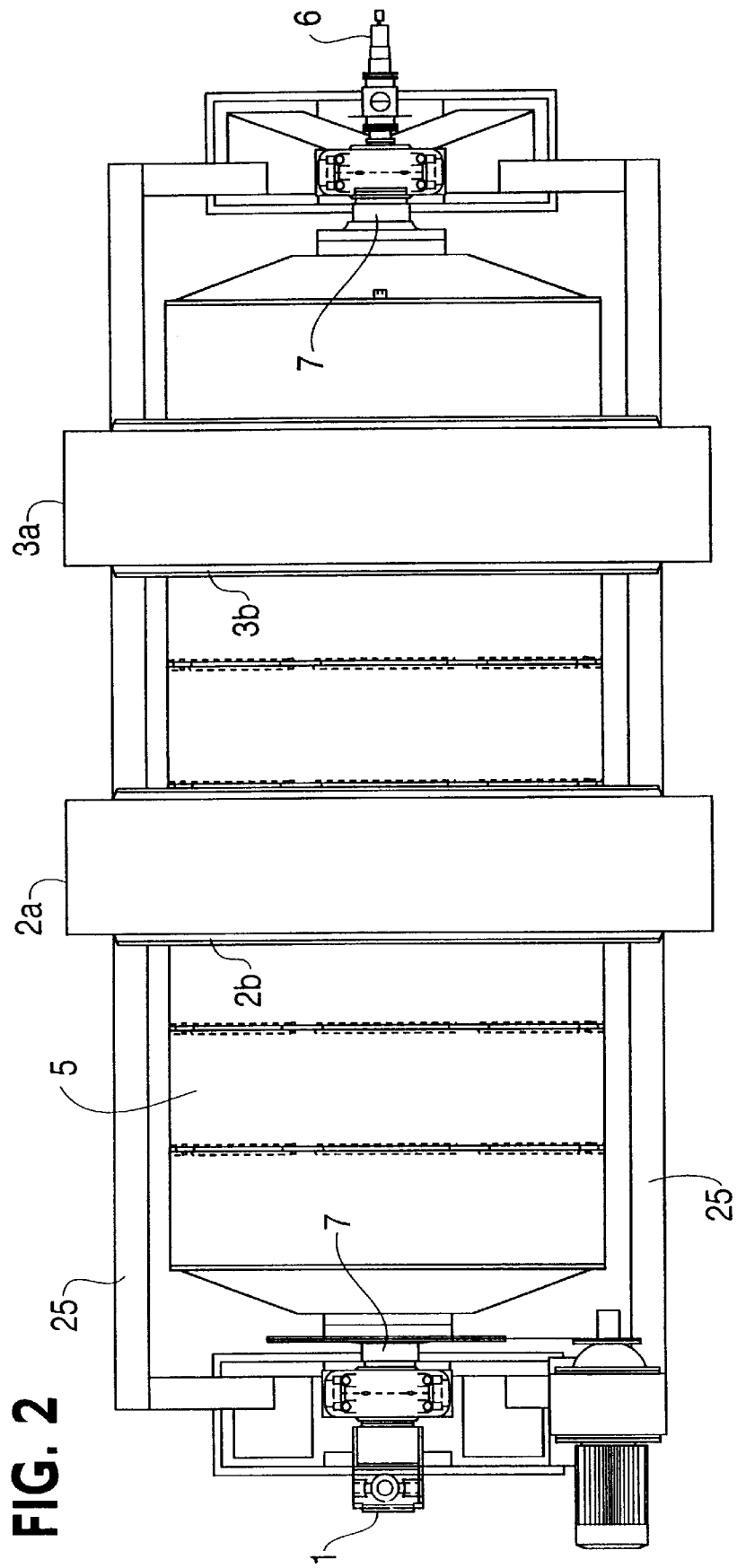
FIG. 2 shows the pressure vessel seen from above.
Figure 3:
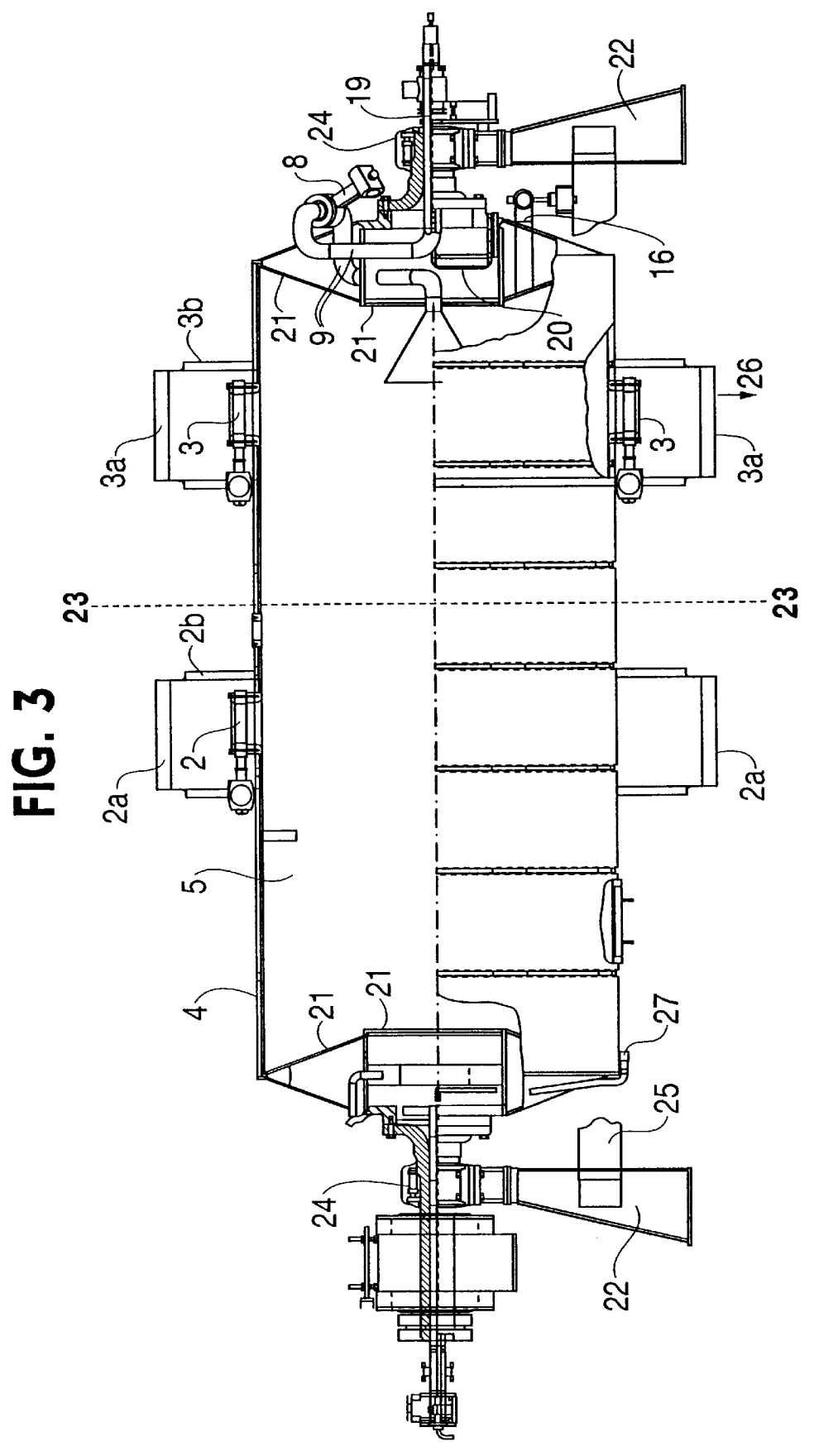

FIGS. 1, 2 and 3 show a horizontally-lying and rotatable processing apparatus according to the invention, comprising a pressure-tight vessel 5 with a steam-heated jacket 4 to which steam is supplied via components etc. 1, and from which condensate can be removed via a tapping-off arrangement 27 for this purpose. The vessel 5 rotates around an axle journal 7 at each side. In the end opposite to that at which the steam is supplied 1, compressed air is introduced via an element 6. A valve 8 is placed in the same end for the connection of vacuum via the pipe 9 and the bearing construction in the right-hand side, where the supply of compressed air which is explained later also takes place. The valve 8 is also used for the de-flashing of the product vessel after the heat treatment.

The actual introduction of the product takes place through a filling valve 2 which sits on the jacket of the pressure vessel 5, and from which the emptying valves 3 are placed at an axial distance. Extending around the valves 2, 3 there are stationary product channels 2a and 3a secured to a frame 25, and annular channel parts 2b, 3b which are secured to the jacket 4 and thus rotate herewith. During filling via the valve 2, the rotation is stopped, preferably with the valve facing vertically upwards as shown. The channels 2a, 2b serve as protective covering for the valve 2 and collect possibly spilled raw material. During emptying via the valves 3 during rotation, the channels 3a, 3b serve as a further collection element from which the sterile product is removed at the bottom 26 for further transport. The valves 2, 3 and the channels 2a, 3a are disposed at a distance from one another and are completely separate. With this construction it is ensured that no contamination of the valves takes place during the emptying of the treated/sterilized product.

The product can be emptied out without changing the direction of rotation. The product valves 2, 3 can be opened and closed by remote control and during rotation. Filling takes place with a stationary process vessel. The product valves are preferably self-locking and are completely sealed by means of an O-ring in each valve.

A pipe 9 leads from the inside of the pressure vessel 5 to the valve 8 for the exhaust of a possible over-pressure.

All valves are preferably maneuvered pnuematically and electrically controlled. All valves can be maneuvered during rotation of the vessel, in that compressed air for this purpose is supplied via the pipe 19 through the one bearing, and electric current for valve control is supplied via a multi-conductor cable 20 in the same bearing construction. This end of the vessel is called the discharge end.

At the other side, the drive end (left-hand side in the drawing), the bearing construction is such that steam under pressure can be introduced via a pipe 1.

The process vessel is suspended in bearings 24 via axle journals 7, but can also be supported by support rollers or similar elements.

Both bearing constructions are completely screened by shields 21, so that stuffing-boxes etc. cannot come in contact with the product. This is possible because no use is made of any through-going axles.

In the shown embodiment, the process vessel is supported by bearing brackets 22 and is driven by an adjustable electric motor via belt or chain drives.

Figure 4:
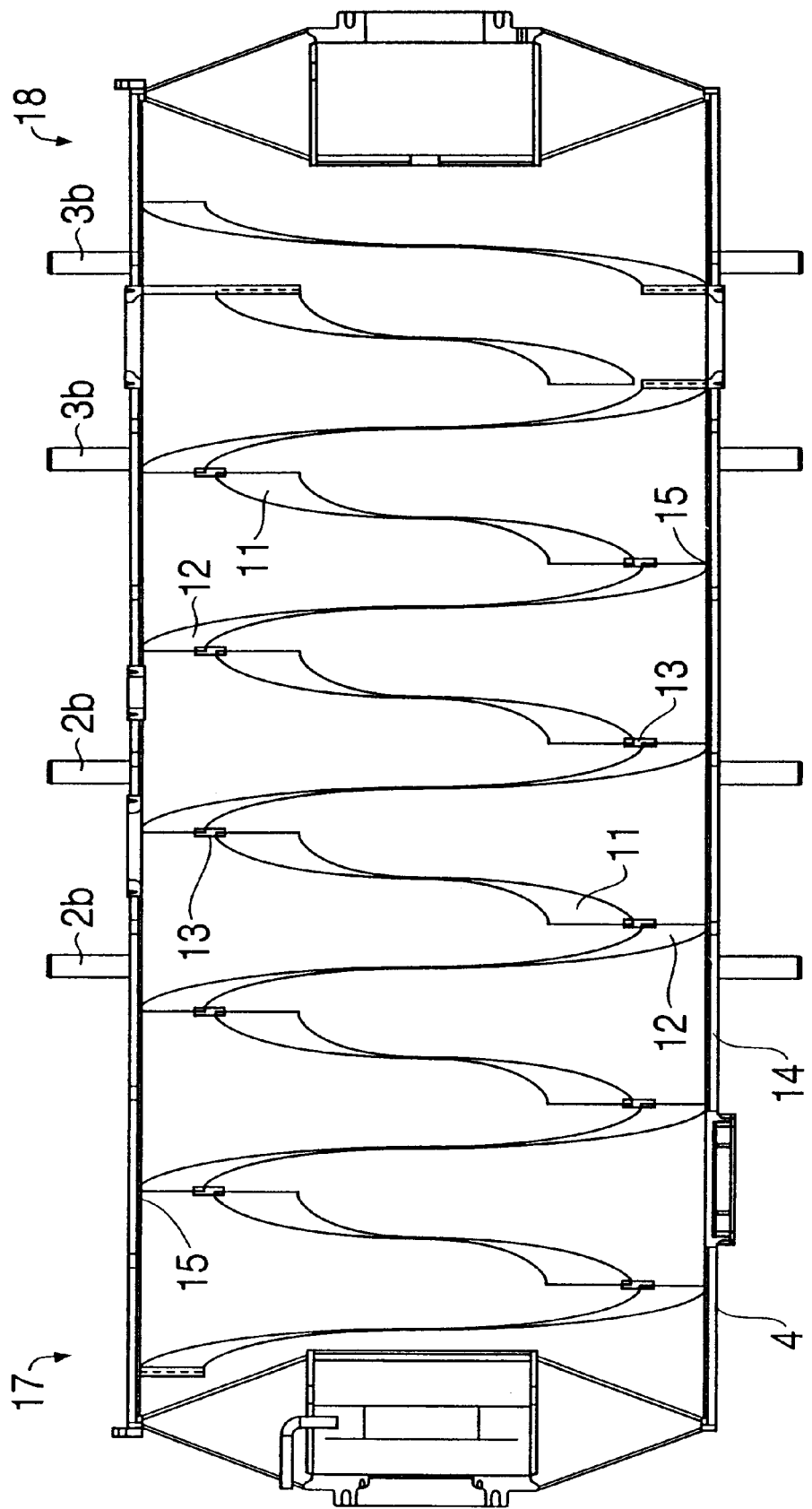
FIG. 4 shows the inside of the pressure vessel with helical vanes.

FIG. 4 shows the inside of the vessel, and where it will be seen that helical vanes are provided for the stirring of the product. These helical vanes comprise outer vanes 12 and inner vanes 11. The outer vanes 12 lie longitudinal to the pressure vessel's jacket, to which they are secured, while the inner vanes are disposed at a distance to the outer jacket and are secured to the outer vanes 12 via a joint 13, for example by welding. The helices of the outer and the inner vanes run in opposite directions, so that upon rotation of the pressure vessel 5 the material which is lying outermost will be conveyed from the one end of the pressure vessel 5 to the other, whereas the material which is lying at a greater distance and corresponding to where the inner vanes 11 are disposed will be conveyed in the opposite direction.

The outer vanes 12 are fastened to the inner surface of the jacket 4 along the edge 15 of the vane 12, for example by welding.

In this way, a good mixing of the material is ensured, which results in a uniform heating, partly through the heating which takes place inside the pressure vessel itself by the injection of steam, and partly as a consequence of the transfer of heat which takes place from the heat surfaces of the jacket 4.

The steam for heating is supplied to the jacket's 4 cavity 14, through which the steam migrates from the one end 17 to the other end 18 of the pressure vessel 5. In the other end of the pressure vessel, the steam can possibly be led into the inside of the vessel depending on the position of the valve 16, and hereby effect a further heating of the product. The steam pressure can be in the range of approx. 100% vacuum to approx. 5 bars, but is preferably around 2 bars (bar overpressure).

The typical dimensions for a pressure vessel as disclosed will be a length of approx. 3–7 m and a diameter of approx. 1.5–3 m. The capacity for sterilization will be in the order of 1–10 tons/hour.

The speed at which the pressure vessel is rotated can be varied continuously from approx. 0.2 to 25 rpm.

Figure 5:
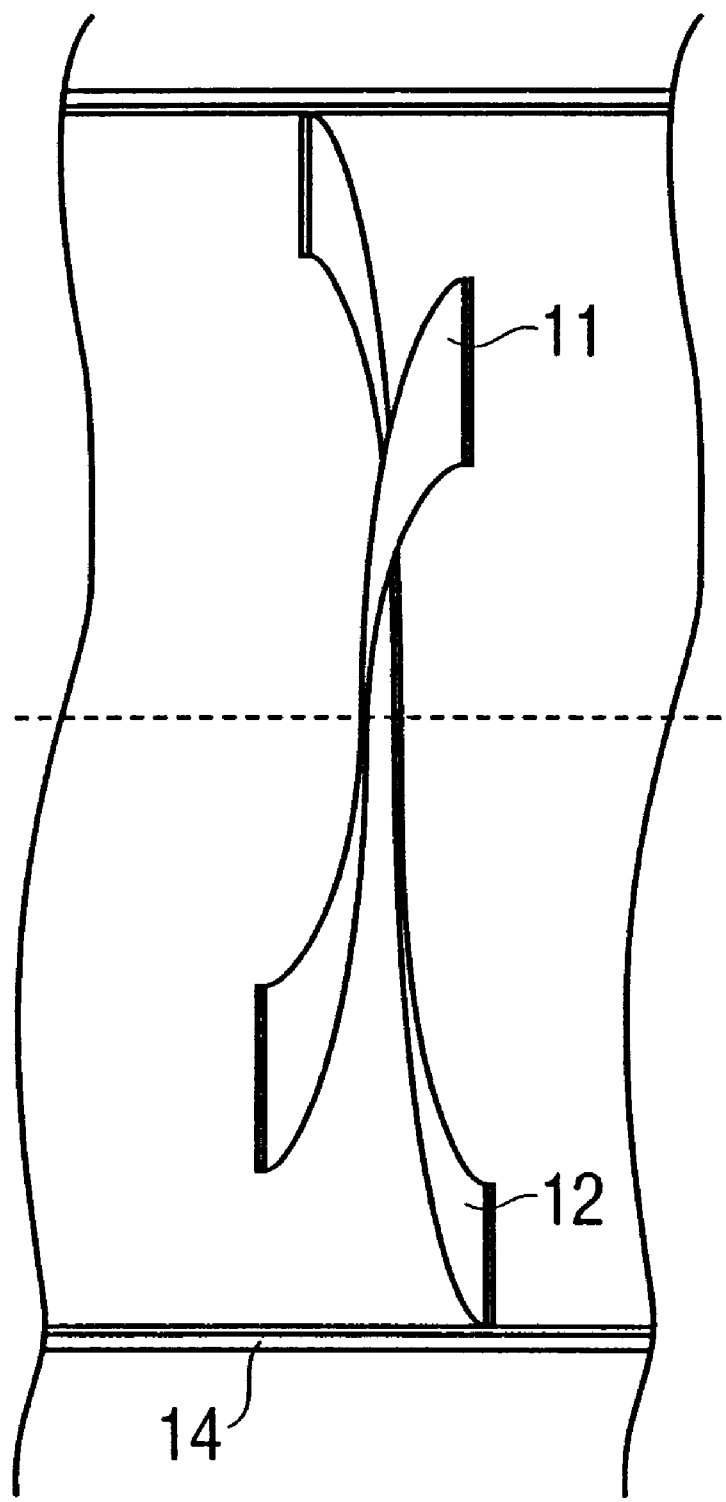
FIG. 5 shows the helical vanes in detail.

In FIG. 5 is seen the construction of the helical vanes in detail, and where it appears clearly how the helix of the inner vane 11 extends the opposite way in relation to the outer vane 12, hereby ensuring that the products are conveyed in opposite directions.

Figure 6:
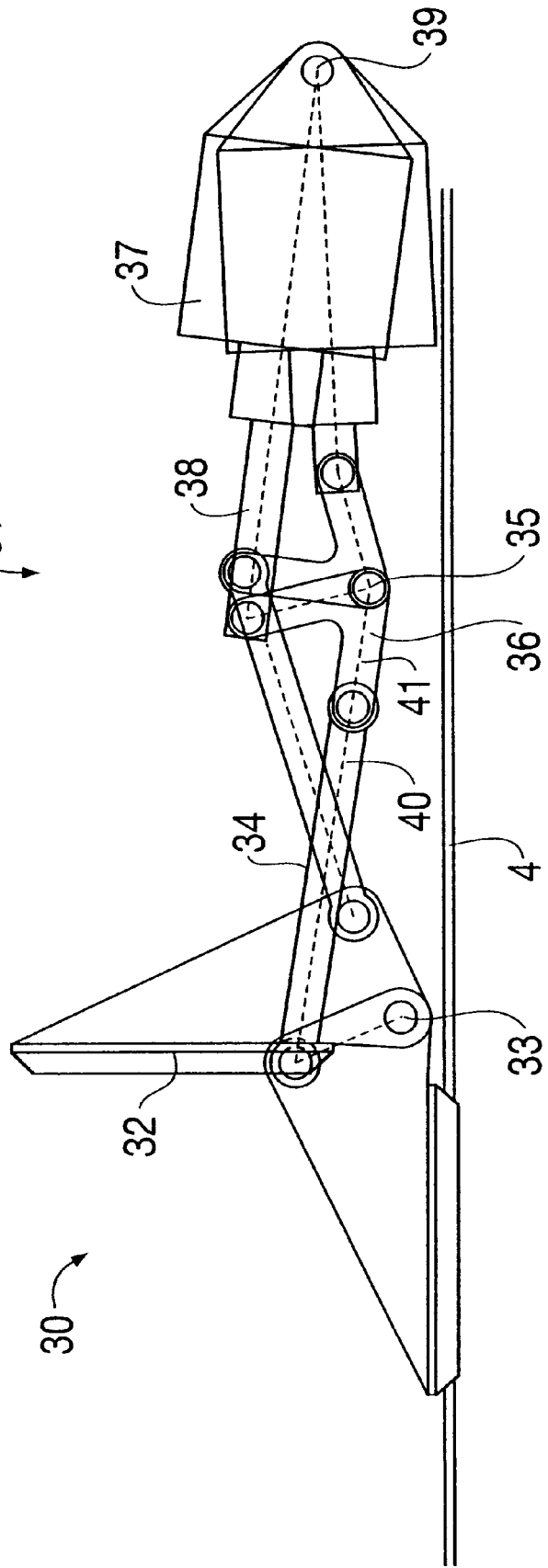
FIG. 6 shows a preferred embodiment of a self-locking valve mechanism according to the invention.

In FIG. 3, the valves 2, 3 are shown in the form of ordinary clack valves, so-called butterfly valves, which are maneuvered by a pneumatic mechanism. However, it is preferred to use a self-locking valve mechanism as shown in FIG. 6, e.g. in connection with a clack valve or the like, similarly shown in FIG. 6, but other forms of valves can also be used, in that it is important that the valve can be closed in a pressure-tight manner against the vessel pressure, and that the closing mechanism is self-locking so that it cannot be opened even though the pressure supply fails. This provides increased security against malfunction, accidents with escaping steam etc.

In FIG. 6 is seen a valve flap 32 which can be turned around a pivot point or an axle 33 by means of a self-locking mechanism 31. The mechanism 31 and the valve 30 are shown in both the open and the closed position. A working cylinder 37, preferably pneumatically activated, can tilt around a point 39 and has a piston rod 38 in engagement with a V-shaped arm 36 with a pivot point 35 and an arm 41 which is in engagement with a valve arm 34 which, as shown in the drawing, is in engagement with the valve flap 32. The arms 34, 36 constitute a self-locking toggle mechanism, so that the axes 40, 41 do not lie completely in extension of each other when the valve flap 32 is closed, but "snap" slightly downwards so that the valve flap cannot be opened. In order to be able to open the valve flap 32, it is necessary for pressure to be applied to the working cylinder 37 for the retraction of the piston rod 38, so that the toggle mechanism 34, 36 is drawn out of engagement.

During the processing, the product is introduced through the supply valve 2. The product will normally be supplied direct from other production equipment, and will normally be heated, e.g. to about 100° C. The pressure vessel 5 is made to rotate during the whole of the process, whereby the product is made to move from the one end of the pressure vessel 17 to the other end 18 during heat treatment/sterilization with heat and pressure.

It is expedient for the vessel to be at least ⅓ full in order to ensure that both the inner helical vane as well as the outer helical vane are taken into use. Otherwise, a sufficient mixing of the product will not always occur, and the handling of the product will thus not be uniform and will not ensure an end product which is sufficiently contamination-free.

The selected process parameters are a function of the product, e.g. in that heating to 133° C. should be effected for 20 minutes when the size of the largest clumps in the material to be treated is 50 mm. The steam heating is carried out at a process pressure of approx. 2 bars, the result being that a complete sterilization is obtained. In the event of the size of the relevant clumps/particles being in excess of 50 mm, the selected process parameters must naturally be changed.

Upon conclusion of the product processing, the steam is de-flashed via the pipe/valve 8 and atmospheric pressure is established. The sterile product is now led out through the discharge valves 3 and the channel 3a, 3b, and can now be transported away, e.g. for packaging.

The process vessel is rotated during the whole of the processing, i.e. both during the sterilization process and during the emptying, in that the vanes ensure that the product is conveyed towards the discharge valves for emptying. The rotation thus contributes both during the processing and during the emptying of the vessel. In order to ensure that the vessel is adequately filled, during the filling it can be necessary to add the product several times with intermediate rotation of the vessel.

The rotating vessel itself can form the boundary between the non-sterile part of a plant and its sterile part, in that the boundary between the parts extends between the filling valve 2 and the discharge valves 3, e.g. as indicated by the line 23 in FIG. 3.

The method, the apparatus and the plant will be able to be used in connection with any form of heat treatment and sterilization of products in particle form, whether this be feedstuffs, bone meal, fish meal or other kinds of granulate materials, and where it is desirable to reduce or totally eliminate any possible bacterial flora in these products.

Since all of the valves can be operated during the rotation of the vessel, one or more of the following functions can take place and can be controlled externally, e.g. from a PLC, a PC screen or operator's control panel:

Steam is led constantly to the heat jacket.

Steam is led constantly to the process vessel.

Condensate is constantly drained from the jackets.

Constant supply of compressed air for valve operation.

Constant supply of electrical signals for valve operation.

Pressure relief/vacuum suction can be opened and closed.

Product discharge valves can be opened and closed.

There are no rotating stuffing-boxes in connection with the product under pressure.

The vessel is filled with product in one or more definite positions.

What is claimed is:

1. A method for the sterilization and/or heat treatment of product, said product being introduced in batches into a pressure vessel which lies substantially horizontal comprising:
   a) providing a pressure vessel having a jacket and a helical vane arrangement along inner surface of the pressure vessel;
   b) placing a batch of the product in the pressure vessel;
   c) closing the pressure vessel and evacuating air therefrom, heating and pressurizing the vessel by supplying steam to the jacket of the pressure vessel to sterilize the product, the heating and pressure treatment occurring for a given period of time as a function of the product being treated therein;
   d) rotating the pressure vessel which causes a mixing and movement of the product to form particles of the product by contacting the product with the helical vane arrangement to produce movement of the product in opposite directions from one end of the pressure vessel to the other end in response to rotation of the pressure vessel in a single direction;
   e) relieving pressure from the pressure vessel; and
   f) emptying heat treated particulate product from the pressure vessel.

2. A method according to claim 1, wherein processing conditions of the product are a minimum temperature of 133° for 20 minutes under a continuous and constant steam pressure of a minimum of 2.0 bars, and a constant supply of steam at a minimum pressure of 2.0 bars is fed to the pressure vessel to sterilize the product.

3. A method according to claim 2, wherein during rotation of the pressure vessel the product positioned closest to the jacket moves from the one end of the pressure vessel towards the other end, and the product positioned at a greater distance from the jacket moves in an opposite direction from the other end to the one end, with the product movement in opposite directions producing mixing of the product.

4. A method according to claim 3, wherein a supply of steam is applied at the one end of the pressure vessel to the jacket and the steam migrates from the one end along surfaces of the jacket to the opposite end of the pressure vessel, then the steam is either fed into an interior of the pressure vessel or fed away from the pressure vessel.

5. A method according to claim 2, wherein a supply of steam is applied at the one end of the pressure vessel to the jacket and the steam migrates from the one end along surfaces of the jacket to the opposite end of the pressure vessel, then the steam is either fed into an interior of the pressure vessel or fed away from the pressure vessel.

6. A method according to claim 2 wherein, compressed air and electric current is supplied to the pressure vessel during rotation to provide power for maneuvering and control of heat control valves in the pressure vessel which control heat treatment/sterilization of the product.

7. A method according to claim 2, wherein heat treated/sterilized product is introduced into the pressure vessel through a first opening/valve spaced at an axial distance from a second opening/valve through which the product is discharged.

8. A method according to claim 1, wherein during rotation of the pressure vessel the product positioned closest to the jacket moves from the one end of the pressure vessel towards the other end, and the product positioned at a greater distance from the jacket moves in an opposite direction from the other end to the one end, with the product movement in opposite directions producing mixing of the product.

9. A method according to claim 8, wherein a supply of steam is applied at the one end of the pressure vessel to the jacket and the steam migrates from the one end along surfaces of the jacket to the opposite end of the pressure vessel, then the steam is either fed into an interior of the pressure vessel or fed away from the pressure vessel.

10. A method according to claim 8 wherein, compressed air and electric current is supplied to the pressure vessel during rotation to provide power for maneuvering and control of heat control valves in the pressure vessel which control heat treatment/sterilization of the product.

11. A method according to claim 8, wherein heat treated/sterilized product is introduced into the pressure vessel through a first opening/valve spaced at an axial distance from a second opening/valve through which the product is discharged.

12. A method according to claim 1, wherein a supply of steam is applied at the one end of the pressure vessel to the jacket and the steam migrates from the one end along surfaces of the jacket to the opposite end of the pressure vessel, then the steam is either fed into an interior of the pressure vessel or fed away from the pressure vessel.

13. A method according to claim 1 wherein, compressed air and electric current is supplied to the pressure vessel during rotation to provide power for maneuvering and control of heat control valves in the pressure vessel which control heat treatment/sterilization of the product.

14. A method according to claim 1, wherein heat treated/sterilized product is introduced into the pressure vessel through a first opening/valve spaced at an axial distance from a second opening/valve through which the product is discharged.

15. A method for the sterilization and/or heat treatment of product, said product being introduced in batches into a pressure vessel which lies substantially horizontal comprising:
   a) providing a pressure vessel having a jacket and a helical vane arrangement along inner surface of the pressure vessel;
   b) placing a batch of the product in the pressure vessel;
   c) closing the pressure vessel and evacuating air therefrom, heating and pressurizing the vessel by supplying steam to the jacket of the pressure vessel to sterilize the product, the heating and pressure treatment occurring for a given period of time as a function of the product being treated therein;
   d) rotating the pressure vessel which causes a mixing and movement of the product to form particles of the product by the pressure vessel contacting the product to produce movement of the product in opposite directions from one end of the pressure vessel to the other end in response to rotation of the pressure vessel in a single direction;
   e) relieving pressure from the pressure vessel; and
   f) emptying heat treated particulate product from the pressure vessel.

16. An apparatus for sterilization and/or heat treatment of a product comprising: a pressure vessel which is rotatable and lies substantially horizontal and a mixing arrangement provided inside the pressure vessel comprising a first outer helical vane lying along an inner wall of the vessel and a second inner helical vane fastened to the first outer helical vane and located at a distance from the inner wall with the helical vanes extending along the pressure vessel and wherein a twist helix of the second inner helical vane extends in an opposite direction in relation to a twist helix of the first outer vane with rotation of the helices in one direction conveying the product in opposite directions towards opposite ends of the pressure vessel.

17. An apparatus according to claim 16, wherein the pressure vessel includes a product inlet valve and a product outlet valve which valves are separated by an axial separation along the pressure vessel.

18. An apparatus according to claim 17, wherein the inlet valve and the outlet valve are sealed with gaskets which do not contact the product.

19. An apparatus in accordance with claim 17 wherein:
   a boundary between sterile and non-sterile areas of the apparatus is located between the product inlet valve and the product outlet valve.

20. An apparatus according to claim 16, wherein the pressure vessel comprises coupling connections to pipes for providing steam heating of a jacket of the vessel, heating an interior of the pressure vessel to heat the product to a sterilization temperature, for steam deflashing and for a vacuum pipe, the coupling connections comprising valves which are controllable to open and close during the rotation of the pressure vessel.

21. An apparatus according to claim 16 further comprising bearings which rotatably suspend the pressure vessel and which are located in brackets disposed outside the pressure vessel.

22. An apparatus according to claim 16, wherein movement of the inlet valve and the outlet valve is produced by a mechanism which is self-locking in a closed condition.

23. An apparatus in accordance with claim 22 wherein the mechanism comprises a toggle-joint mechanism comprising a V-shaped arm coupled between a working cylinder and a valve.

24. An apparatus for sterilization and/or heat treatment of a product comprising: a pressure vessel which is rotatable and lies substantially horizontal and a mixing arrangement provided inside the pressure vessel with rotation of the mixing arrangement in one direction conveying the product in different radial zones of an interior of the vessel relative to an axis of rotation of the pressure vessel in opposite directions towards opposite ends of the pressure vessel.

* * * * *